United States Patent [19]

Tomita et al.

[11] 4,019,246
[45] Apr. 26, 1977

[54] MACHINE TOOL WITH AUTOMATIC TOOL CHANGER

[75] Inventors: Tamaki Tomita, Okazaki; Manabu Hosokawa, Chiryu, both of Japan

[73] Assignee: Toyoda Koki Kabushiki Kaisha, Japan

[22] Filed: Oct. 23, 1975

[21] Appl. No.: 625,034

[30] Foreign Application Priority Data

Oct. 23, 1974 Japan ............... 49-122298

[52] U.S. Cl. .................................................. 29/568
[51] Int. Cl.[2] ........................................ B23Q 3/157
[58] Field of Search ................................. 29/568

[56] References Cited

UNITED STATES PATENTS

| | | | |
|---|---|---|---|
| 3,161,951 | 12/1964 | Anthony | 29/568 |
| 3,249,997 | 5/1966 | Hutchens | 29/568 |
| 3,422,724 | 1/1969 | Zankl et al. | 29/568 X |
| 3,851,562 | 12/1974 | Tomita et al. | 29/568 X |

Primary Examiner—Frank T. Yost
Assistant Examiner—Z. R. Bilinsky
Attorney, Agent, or Firm—Oblon, Fisher, Spivak, McClelland & Maier

[57] ABSTRACT

A machine tool includes an indexing device for indexing a spindle to a predetermined angular position for engagement between a key member disposed upon the spindle and a key-way disposed upon a tool to be used. When either the tool, to be used next, upon a tool storage magazine, or a used tool, held upon the spindle, is a tool utilized for heavy cutting, the indexing device is operated before the tool change operation is performed. On the other hand, when the tool to be used next, and the used tool, are both tools utilized for light cutting, the tool change operation is performed without operation of the indexing device.

4 Claims, 7 Drawing Figures

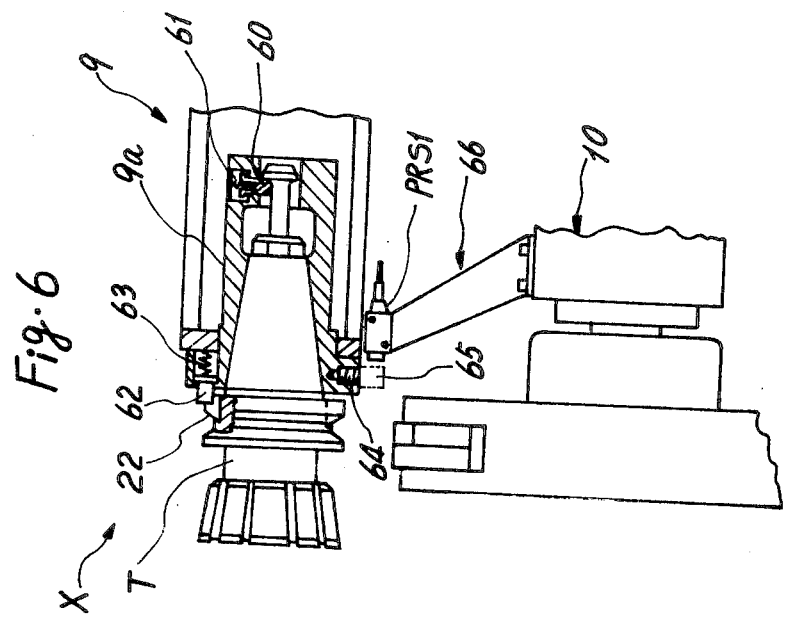
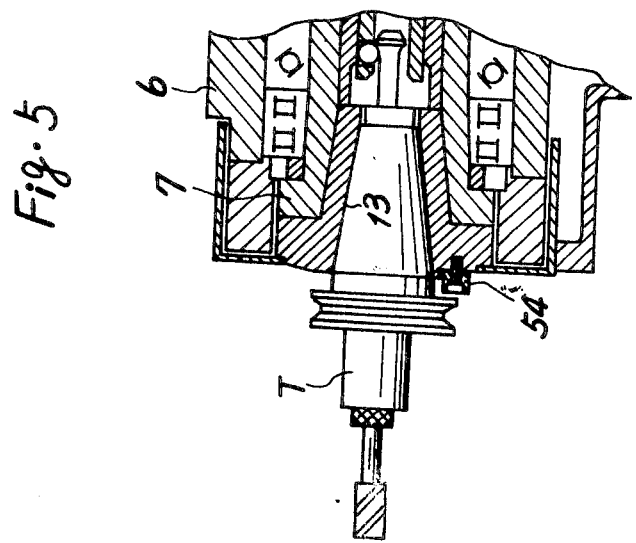

MACHINE TOOL WITH AUTOMATIC TOOL CHANGER

BACKGROUND OF THE INVENTION

1. Field of the Invention

The present invention relates generally to machine tools, and more particularly to an automatic tool changer capable of exchanging tools between a tool storage magazine and tool spindle.

2. Description of the Prior Art

In the past, a plurality of tools have been stored within a tool storage magazine, each of the tools being located at a predetermined angular position thereon, and a tool spindle, having a key member, has been indexed to a predetermined angular position prior to the tool change operation so that a tool inserted within the spindle may be positively driven as a result of the engagement between a key-way of the tool and the key member of the spindle. Therefore, the cut-to-cut time, that is, the time required from the completion of the machining operation by means of the tool held upon the spindle to the start of the machining operation by means of the next tool, has been substantially long.

SUMMARY OF THE INVENTION

Accordingly, it is an object of the present invention to provide a machine tool with an automatic tool changer capable of shortening the cut-to-cut time.

Another object of the present invention is to provide a machine tool with an automatic tool changer wherein an indexing device for indexing a spindle to a predetermined angular position is selectively operated.

Still another object of the present invention is to provide a machine tool with an automatic tool changer wherein the indexing device is operated prior to a tool change operation when either the tool to be used next, or a used tool, is a tool utilized for heavy cutting, and wherein a tool change operation is performed without operating the indexing device when the tool to be used next, and the used tool, are tool utilized for light cutting.

Yet another object of the present invention is to provide a machine tool with an automatic tool changer wherein a tool change command embodied within a program stored within a numerical control device determines whether or not the indexing device is to be operated.

A further object of the present invention is to provide a machine tool with an automatic tool changer wherein a detecting means detects whether or not the tool to be used next is for light or heavy cutting, and memory means memorizes the fact that the used tool is utilized for heavy cutting, in order to determine whether or not the indexing device is to be operated.

The foregoing and other objects are attained in accordance with one aspect of the present invention, through the provision of a machine tool which includes a tool storage magazine for removably storing a first group of tools and a second group of tools and capable of indexing a selected tool to a predetermined tool change position, a first engaging member provided upon each of the first group of tools, a second engaging member provided on the tool storage magazine and engageable with the first engaging member so as to position the same to a predetermind angular position, a spindle head, a spindle rotatably mounted upon the spindle head, a third engaging member provided upon the spindle and engageable with the first engaging member, an indexing device for indexing the spindle to a predetermined angular position so as to align the third engaging member of the spindle with the second engaging member indexed to the tool change position, and control means for selectively causing the indexing device to be operated before the tool change is operated.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 5 is a cross-sectional view showing a modification of the spindle of the first embodiment;

FIG. 6 is a side elevation view, partly in cross-section of a tool identification device of a second embodiment of the present invention.

DETAILED DESCRIPTION OF THE PREFERRED EMBODIMENTS

Figure 1:
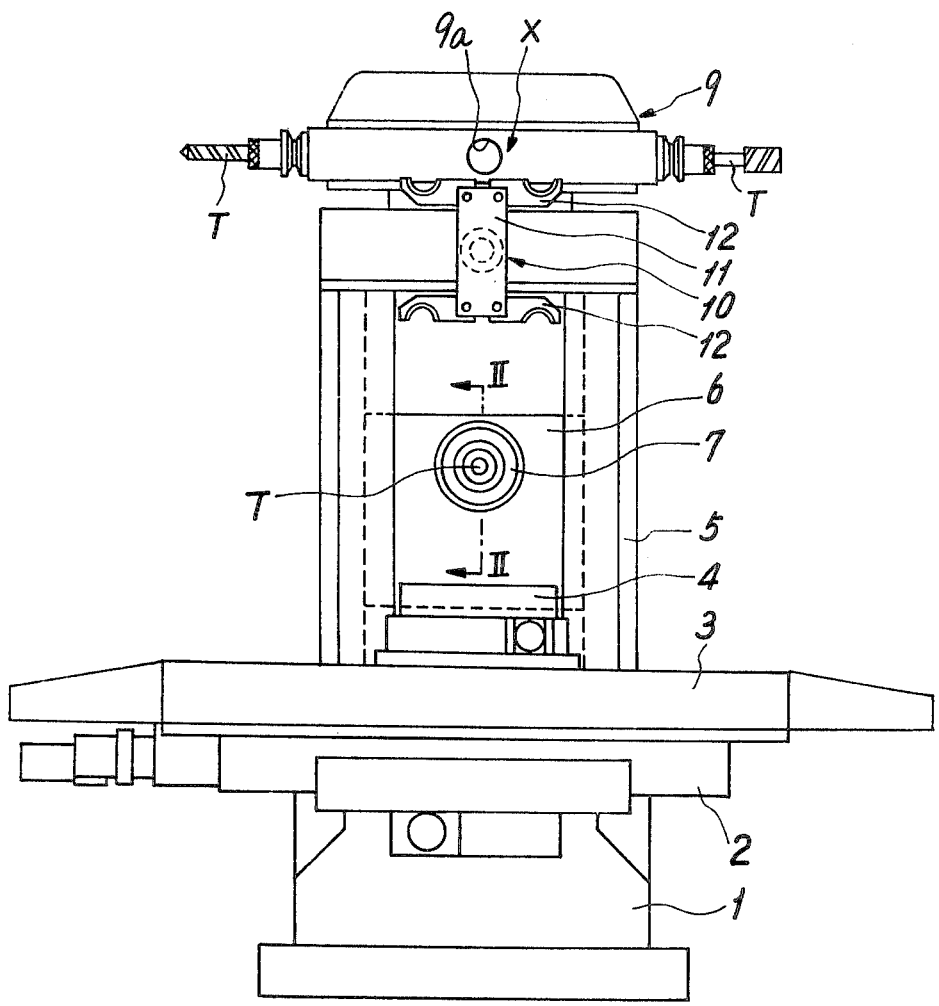
FIG. 1 is a front elevation view of a first embodiment of an apparatus constructed in accordance with the present invention and showing its cooperative parts.
Figure 2:
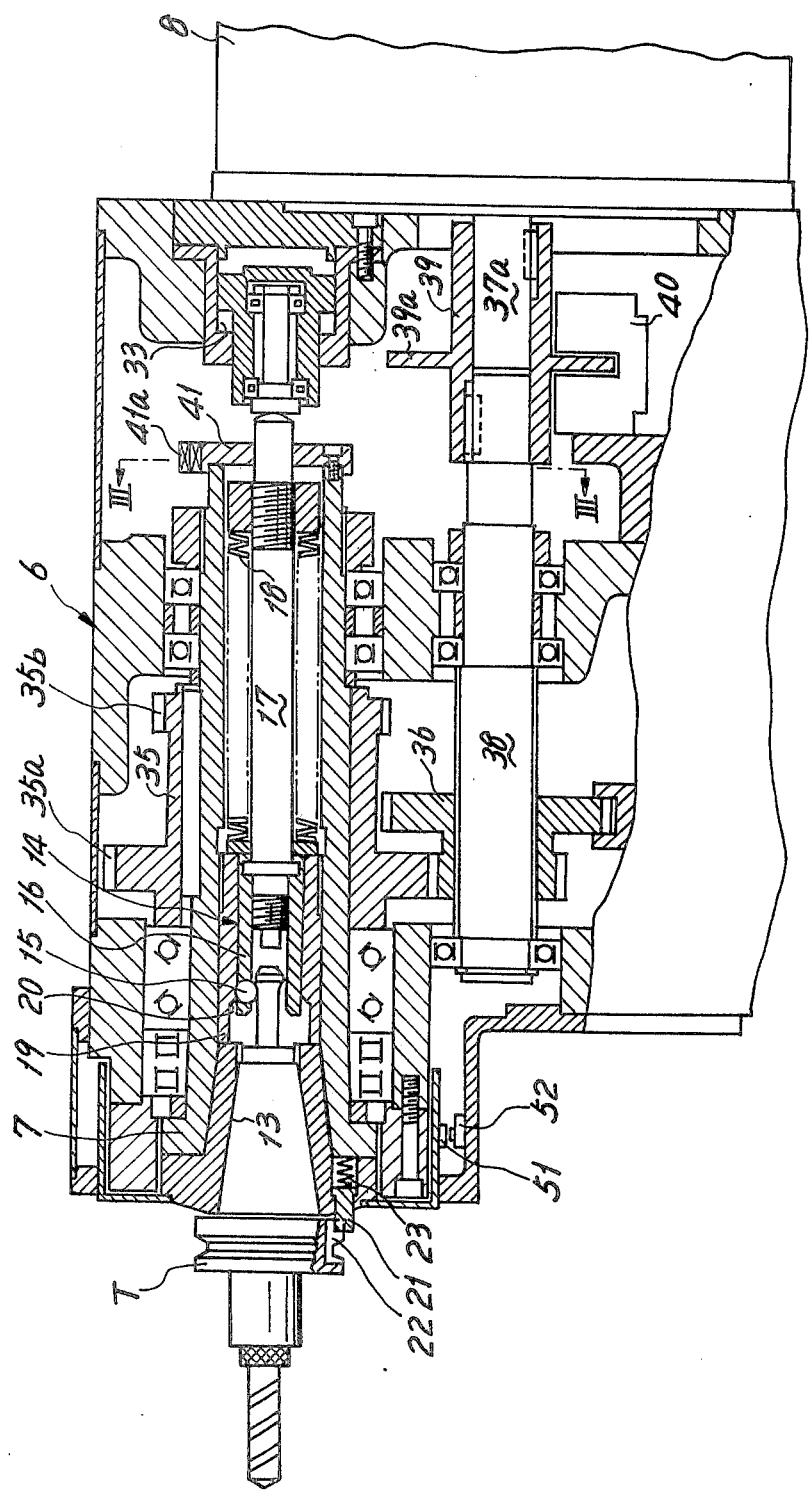
FIG. 2 is a cross-sectional view of the apparatus of FIG. 1, taken along the line II—II of FIG. 1, showing the details of the spindle head.
Figure 3:
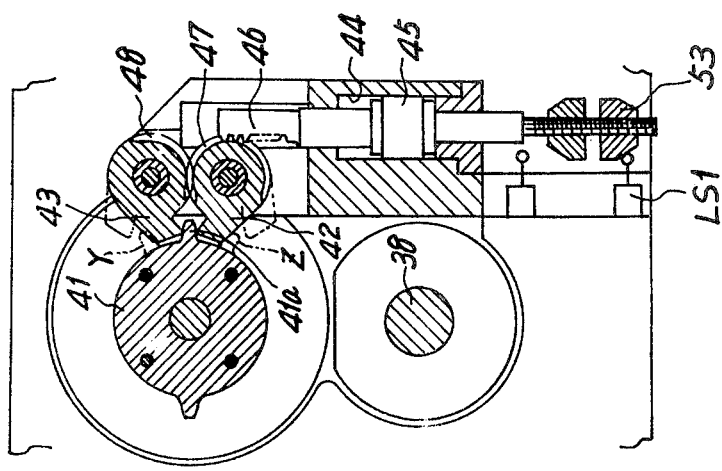
FIG. 3 is a cross-sectional view of the apparatus of FIG. 2, taken along the line III—III of FIG. 2, showing an indexing device for indexing the spindle to a predetermined position.

Referring now to the drawings, and more particularly to FIGS. 1–3 thereof, there is shown within FIG. 1, a bed 1 upon which a saddle 2 is slidably mounted for transverse movement. A table 3 is, in turn, slidably mounted upon the saddle 2 for longitudinal movement, and a rotary table 4, which is adapted to support a workpiece to be machined, is mounted upon table 3. An upstanding column 5 is mounted upon the bed 1 and a spindle head 6 is slidably mounted upon the column 5 for vertical movement, a spindle 7 being rotatably mounted within spindle head 6 and being drivingly connected to a motor 8, as shown within FIG. 2.

A tool storage magazine, generally indicated by the reference character 9, is mounted upon the top of column 5 and comprises a plurality of tool sockets 9a for storing a variety of tools T such that a tool to be used next may be indexed to a tool change position, generally indicated by the reference character X. Each socket 9a is provided with a key member slidably received therein and urged forwardly by means of spring member, so as to be engageable with a key-way of a tool inserted therein, and which is similar to a key member disposed upon the spindle, which will be described hereinafter. Upon column 5 there is mounted a tool change device, generally indicated by the reference character 10, which comprises a tool change arm 11 and a pair of tool grippers 12 for performing a tool change operation.

A tool change operation is briefly performed as follows. In response to a tool change command, the grippers 12 simultaneously grasp the tool indexed at the tool change position X to be used next and the used tool held within the spindle 7, and subsequently, the tool change arm 11 is advanced, so as to remove the tools and is rotated through 180°. The arm 11 is then retracted so as to insert the exchanged tools into the magazine 9 and the spindle 7, respectively, and the grippers 12 are then opened so as to release the tools.

As shown more particularly with FIG. 2, each tool T is provided with a pull stud portion which is adapted to be drawn inwardly by means of a conventional clamp device, generally indicated by the reference character 14, when the tool is inserted into a tapered hole or bore 13 formed within the end of the spindle 7 whereby the tool T is clamped against the spindle 7. The clamp device 14 comprises an annular retainer 16 retaining therein at least one steel ball 15, and when the retainer 16 is drawn in the right direction, as viewed within FIG. 2, by means of a spring 18 and a rod 17 threadedly engaged with the retainer 16, the ball 15 is moved inwardly along a tapered surface 20 of a sleeve 19 so that the ball 15 is tightly engaged with the pull stud portion of the tool so as to firmly clamp the tool within the tapered bore 13.

When the rod 17 is moved in the left direction by means of a hydraulic cylinder 33 against the biasing force of spring 18, the ball 15 is moved outwardly so that the tool may be removed from the spindle 7. A key member 21 is disposed within the radially outward portion of the front end of the spindle 7 so as to be slidable in the direction disposed parallel to the axis of the spindle and is urged in the left direction by means of a spring 23 so as to be engageable with a key way 22 formed upon the tool inserted into the tapered bore 13 of the spindle 7.

Upon the middle portion of the spindle 7, there is fixed a gear member 35 which comprises a large gear 35a and a small gear 35b which are selectively engaged with gears upon a gear member 36. The gear member 36 is splined to a spline shaft 38 which is connected to the output shaft 37a of the motor 8 through means of a coupling member 39. The coupling member 39 is formed with an annular plate 39a, a partial portion of which is surrounded by means of a brake device 40 whereby a braking force may be applied to the annular plate 39a when brake device 40 is energized. At the rear end of the spindle 7, there is fixed an index plate 41 which is provided with a projection 41a which is adapted to be interposed and movable between positions Y and Z, as shown within FIG. 3, so as to be engageable with a pair of pivotal claws 42 and 43.

The claws 42 and 43 are engaged with each other through means of pinion gears 47 and 48 thereof, the pinion gear 47 also being engaged with a rack member 46 formed upon a piston 45 of a hydraulic cylinder 44. The piston 45, when actuated downwardly, closes the claws 42 and 43, thus positioning the projection 41a or the spindle 7 at a predetermined angular position, at which position, the key member 21 upon spindle 7 is aligned and engaged with the key-way 22 of the tool T, while another tool T, which is held within the tool socket 9a upon the magazine 9 is similarly disposed with the key-way 22 thereof being engaged with the key member 21 upon the tool socket 9a, the magazine tool T being subsequently inserted into the tapered bore 13 of the spindle 7 by means of the tool change device 10.

Figure 4:
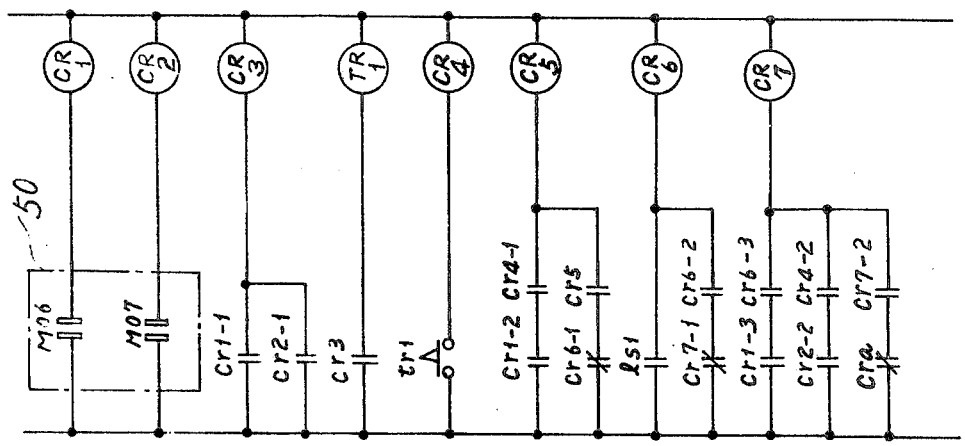
FIG. 4 is an electrical circuit diagram of the first embodiment.

The operation of the first embodiment of the present invention will now be described with reference to FIG. 4 showing an electrical circuit diagram of the embodiment. Initially, the operative description will be made under the conditions that the tool to be used next is a tool, such as, for example, a milling tool, which is utilized for heavy cutting. When a predetermined machining operation is completed by means of a tool held within spindle 7, a numerical control device 50 reads out, in accordance with a predetermined program, a tool change command MO6 instructing the apparatus that the key-way 22 of the tool to be used next is to be engaged with the key member 21 when the next tool is inserted into the spindle 7, because the next tool is used for heavy cutting.

With the tool change command MO6 read out, contact MO6 is closed so as to energize a relay CR1. Accordingly, a relay CR3 is energized through means of a normally open contact $cr1$-$l$ of the relay CR1 so as to thereby initiate a tool change cycle, and thus, the spindle head 6 is moved upwardly to a predetermined tool change position, the motor 8 is de-energized, and the brake device 40 is actuated so as to stop the rotation of the spindle 7. With the relay CR3 energized, a timer TR1 is also energized through means of a normally open contact $cr3$ of the relay CR3. The timer TR1 is timed-out after a predetermined time period, which is sufficient enough to permit the spindle rotation to in fact be terminated, has lapsed, and with the timer TR1 timed-out, a relay CR4 is energized through means of a normally open contact $tr1$ of the timer TR1 so as to thereby confirm the stopping of the spindle rotation.

With the relay CR4 energized, a relay CR5 is likewise energized through means of normally open contacts $cr1$-$2$ and $cr4$-$1$ of the relays CR1 and CR4, respectively, and is maintained energized through means of a normally open contact $cr5$ thereof in order to commence indexing of the spindle 7 to the predetermined angular position. With the relay CR5 energized, the spindle 7 is rotated at a relatively slow rate of speed until a dog 51, fixed upon the spindle 7, actuates an adjacent switch 52 fixed upon the spindle head 6, as shown within FIG. 2. With the switch 52 actuated, the brake device 40 is in turn actuated so as to terminate the rotation of spindle 7 such that the projection 41a of the index plate 41 is interposed between positions Y and Z, as shown within FIG. 3.

Subsequently, the brake device 40 is deenergized and the hydraulic cylinder 44 is actuated so as to move the piston 45 downwardly whereby the claws 42 and 43 are closed so as to position the projection 41a, and the spindle 7, at a predetermined angular position. When a limit switch LS1 is actuated by means of a dog 53 as a result of the downward movement of the piston 45, a relay CR6 is energized by means of a normally open contact $ls1$ of the limit switch LS1 so as to confirm the completion of the indexing of the spindle 7.

With the indexing of the spindle 7 completed, a relay CR7 is energized through means of normally open contacts $cr1$-$3$ and $cr6$-$3$ of the relays CR1 and CR6 so as to initiate the tool change operation. In accordance with the energization of the relay CR7, the grippers 12 of the tool change device 10 grasp the tool to be used next and indexed to the tool change position X upon the magazine 9, as well as the used tool held within the spindle 7, and the hydraulic cylinder 33 is then actuated so as to move the rod 17 toward the left, as viewed within FIG. 2, against the biasing force of spring 18 in order to thereby release the tool within spindle 7 from the clamping action of the clamp device 14.

The tool change arm 11 is then advanced so as to remove the tools from the magazine and spindle, respectively, and is subsequently rotated through an angle of 180°. The arm 11 is then retracted so as to engage the key-way 22 of the next tool with the key member 21 of the spindle 7 and to insert the next tool within the spindle 7, as well as to return the used tool to the magazine 9. The hydraulic cylinder 33 is accordingly actuated so as to permit the rod 17 to be drawn toward the right by means of the biasing force of spring 18 whereby the ball 15 is engaged with the pull stud portion of the next tool in order to firmly clamp the next tool within the tapered bore 13 of the spindle 7, and lastly, the grippers 12 are opened so as to release the tools and the hydraulic cylinder 44 is actuated so as to move the piston 45 upwardly and thereby move the claws 42 and 43 away from each other, the tool change cycle thus being completed.

Moreover, when the used tool is a tool utilized for heavy cutting, the tool change command MO6 is also read out by means of the numerical control device 50 in order to perform the same tool change operation as the operation described hereinabove and thereby the used tool is returned to the magazine 9 with the key-way 22 of the used tool being engaged with the key member of the tool socket 9a of the magazine 9.

Description will now be given under the conditions wherein the tool to be used next and the tool inserted within the spindle 7 are tools, such as, for example, reaming tools, to be utilized for light cutting. When a predetermined machining operation is completed by means of a tool held within the spindle 7, the numerical control device 50 reads out, in accordance with a predetermined program, a tool change command MO7 instructing the apparatus that the key-way 22 of the tool to be used next does not have to be engaged with the key member 21 of the spindle 7 when the next tool is inserted into the spindle 7, because the next tool and the used tool are utilized for light cutting. With the tool change command MO7 read out, its contact MO7 is closed so as to energize the relay CR2, and accordingly, the relay CR3 is energized through means of a normally open contact cr2-1 of the relay CR2 in order to thereby commence a tool change cycle.

Thus, similarly to the previously described operation, the spindle head 6 is moved upwardly to the predetermined tool change position and the rotation of the spindle 7 is terminated. When the stoppage of the spindle rotation has been confirmed by means of the energization of the relay CR4, the relay CR7 is energized through means of normally open contacts cr2-2 and cr4-2 of the relays CR2 and CR4 whereby a tool change operation is performed by means of the tool change device 10. Within this tool change operation, since the spindle 7 is not indexed to the predetermined angular position, the key-way 22 of the next tool is not engaged with the key member 21 of the spindle, but moves the same rearwardly against the biasing force of spring 23 when the next tool is inserted into the spindle 7. Accordingly, under this situation, since the spindle 7 is not indexed to the predetermined angular position, the time period for the tool change operation can be considerably shortened thereby increasing the efficiency of the machine.

Within the embodiment described hereinabove, the key member 21 is slidably received within the spindle 7 in order to prevent interference between the key member 21 and a tool when the key-way 22 is not required to be engaged with the key member 21. However, it is possible to fix a key member 54 to the spindle, as shown within FIG. 5, if the width of the flange of the tool utilized for light cutting, is shortened so as to prevent any interference therebetween.

It is thus seen that according to the first embodiment of the present invention, a tool change command embodied within the program stored within the numerical control device 50 determines whether or not the spindle 7 is to be indexed to the predetermined angular position for the tool change operation. However, it is also possible, according to a second embodiment of the present invention to determine whether or not the spindle 7 is to be indexed as a result of a mechanical identification of the tool to be used next and an electrical memorization of the used tool.

Referring then to FIG. 6 which shows the second embodiment of the present invention, each socket 9a upon the tool storage magazine 9 is provided with a plunger 60 which is radially biased by means of a spring 61 in order to contact and retain a tool inserted therein, through means of the stud portion thereof. A key member 62 is disposed within the front end of the socket 9a and is biased in the left direction by means of a spring 63. Accordingly, when a tool, key-way 22 of which is to be engaged with the key member 21 upon the spindle 7 during normal operation, is inserted within the socket 9a, the key-way 22 is engaged with the key member 62 upon the socket 9a. On the other hand, when a tool, a key-way 22 of which is not required to be engaged with the key member 21 upon the spindle 7 during normal operation, is inserted within the socket 9a, the key-way 22 is not engaged with the key member 62 upon the socket 9a, but biases the same toward the right against the biasing force of spring 63.

Within the lower portion of socket 9a, there is formed a threaded portion 64 into which an identification member 65 is threadedly engaged when the socket 9a is adapted to receive a tool, a key-way 22 of which is not required to be engaged with the key member 21 upon the spindle 7 during normal operation, and a detecting device 66, for detecting the existense of the identification member 65, comprises a switch PRS1 which is mounted upon the tool change device 10.

Figure 7:
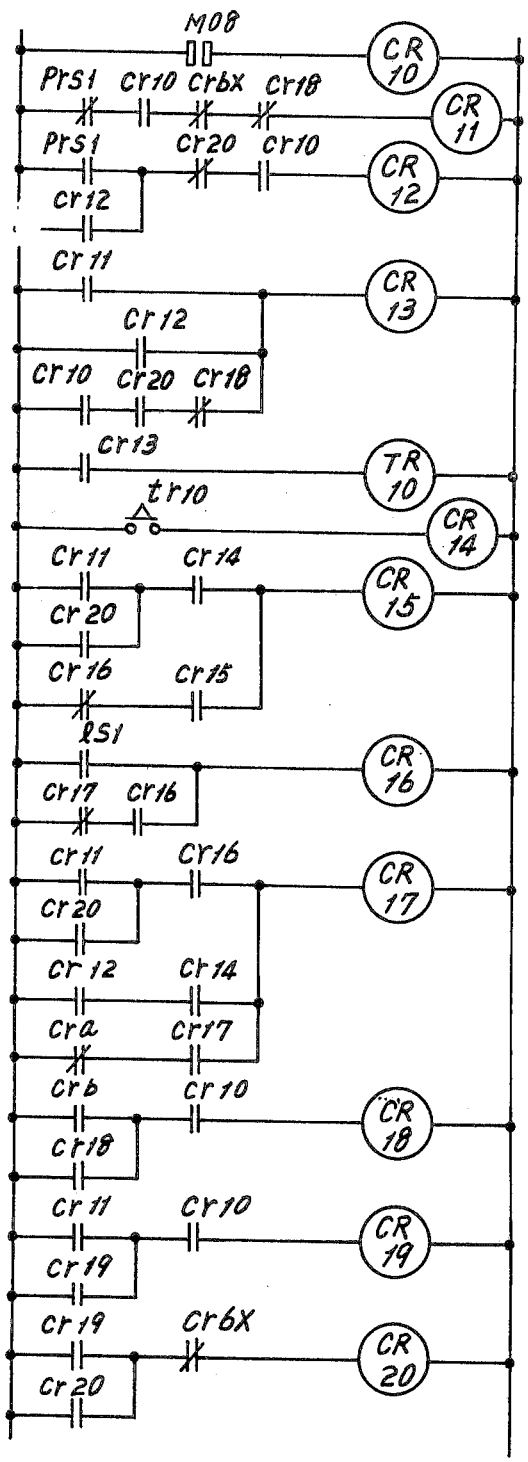
FIG. 7 is an electrical circuit diagram of the second embodiment.

The operation of the second embodiment illustrated within FIG. 6 will now be described with particular reference being made to FIG. 7 which shows an electrical circuit diagram therefor. When a tool to be used next is a tool, such as, for example, a milling tool, that is, a tool utilized for heavy cutting, the tool socket 9a holding the next tool is not provided with the identification member 65, and therefore, when the next tool is indexed to the tool change position X, the switch PRS1 is not actuated. Accordingly, when a tool change command MO8 is read out, a relay CR10 is energized through means of a normally open contact MO8 whereby a relay CR11 is in turn energized through means of a normally open contact cr10 and a normally closed contact cr18, a normally closed contact prs1 of the switch PRS1, and a normally closed contact crbx which is opened when the hydraulic cylinder 33 is actuated for unclamping the used tool held upon the spindle 7.

With the relay CR11 energized, a tool change operation, including the indexing of the spindle to the predetermined angular position, is performed similiarly to the operation in accordance with the tool change command MO6 of the first embodiment. However, within this embodiment, the used tool is temporarily returned to the tool socket which held the next tool, and while a machining operation is being performed by means of the next tool, the used tool is removed and returned by means of the tool change device 10 to a home tool socket which is addressed to hold the used tool.

Furthermore, with the relay CR11 energized, a relay CR19 is also energized and maintained so energized, and in accordance therewith, a relay CR20 is also energized through means of a normally open contact cr19 of relay CR19 and a normally closed contact crbx which is opened when the hydraulic cylinder is actuated for unclamping the used tool upon the spindle 7. Accordingly, the relay CR20 is deenergized when the used tool is unclamped and is again energized and maintained energized when the next tool is clamped within the spindle 7, so as to thereby memorize, for the next tool change operation, that the tool presently held within the spindle 7 is a tool for heavy cutting.

When a tool to be used next is a tool utilized for light cutting, and a used tool is a tool utilized for heavy cutting, the switch PRS1 is actuated when the next tool is indexed to the tool change position, however, since the used tool is a tool utilized for heavy cutting, the relay CR20 is maintained energized. Therefore, a relay CR13 is energized in accordance with a tool change command MO8, and with the relay CR13 so energized, a tool change operation including the indexing of the spindle to the predetermined angular position is performed similar to the operation performed in accordance with the tool change command MO6 of the first embodiment. When the used tool is unclamped within the spindle 7, the relay CR20 is deenergized and maintained deenergized even if the next tool utilized for light cutting is clamped within the spindle.

When the tool to be used next and the used tool are both tools utilized for light cutting, the switch PRS1 is energized and the relay CR20 is maintained deenergized, and accordingly, a relay CR12 is energized whereby a tool change operation without indexing the spindle to the predetermined angular position is able to be performed similar to the operation in accordance with the tool change command MO7 of the first embodiment.

Obviously, numerous modifications and variations of the present invention are possible in light of the above teachings. It is to be understood therefore that within the scope of the appended claims, the invention may be practiced otherwise than as specifically described herein.

We claim:

1. A machine tool comprising:
   a tool storage magazine for removably storing a first group of tools and a second group of tools and capable of indexing a selected tool to a predetermined tool change position;
   a key way provided upon each of said first and second group of tools;
   a plurality of first key members, each of which is slidably disposed upon said tool storage magazine and engageable with one of said key ways of said tools so as to position one of said tools to a predetermined angular position;
   a plurality of resilient members, each of which is disposed within said tool storage magazine for urging each of said first key members outwardly to a position for engaging said key ways of said tools;
   a spindle head;
   a tool spindle rotatably mounted upon said spindle head;
   a second key member slidably disposed upon said spindle and engageable with said key way of a first group tool received in said spindle;
   a resilient member disposed within said spindle for urging said second key member outwardly to a position for engaging said key way of said first group tool;
   a tool spindle indexing device provided within said spindle head for indexing said spindle to a predetermind angular position so as to align said second key member of said spindle with on of said first key members indexed to said tool change position;
   a tool change device for exchanging a tool held upon said spindle and a tool positioned at said tool change position on said tool storage magazine;
   means for generating a first signal when either the tool to be used next, or the used tool, is a tool of said first group, and a second signal when the tool to be used next, or the used tool, are tools of said second group;
   a first control circuit responsive to said first signal for causing said tool spindle indexing device to be actuated and for causing said tool change device to be subsequently operated; and
   a second control circuit responsive to said second signal for causing said tool change device to be operated without operating said tool spindle indexing device.

2. A machine tool as claimed in claim 1, wherein:
   said generating means generates said first and second signals in response to a tool change command stored within a program.

3. A machine tool as claimed in claim 1, further comprising:
   detecting means for detecting whether or not a tool to be used next is a tool of said first group; and
   memory means for memorizing the fact that the used tool held upon said spindle is a tool of said first group;
   said generating means generating said first and second signals in response to said detecting means and said memory means.

4. A machine tool as claimed in claim 3, wherein:
   said detecting means comprises a switch which is actuated when a tool indexed to said tool change position to be used next is a tool of said second group, and which is not actuated when a tool indexed to said tool change position to be used next is a tool of said first group;
   said memory means comprises a relay which is held deenergized for a next tool change operation when said switch is actuated, and which is held energized for a next tool change operation when said switch is not actuated; and
   said generating means generates said first signal when said switch is not actuated or said relay is held energized, and generates said second signal when said switch is actuated and said relay is held deenergized.

* * * * *